United States Patent [19]
Meadowcroft

[11] Patent Number: 5,522,001
[45] Date of Patent: May 28, 1996

[54] OPTICAL FIBER COUPLED DEVICES AND METHOD OF ASSEMBLING SAME

[75] Inventor: Simon G. P. Meadowcroft, Stowmarket, United Kingdom

[73] Assignee: Hewlett-Packard Company, Palo Alto, Calif.

[21] Appl. No.: 367,293

[22] PCT Filed: Aug. 20, 1993

[86] PCT No.: PCT/GB93/01772

§ 371 Date: Jan. 12, 1995

§ 102(e) Date: Jan. 12, 1995

[87] PCT Pub. No.: WO94/04955

PCT Pub. Date: Mar. 3, 1994

[30] Foreign Application Priority Data

Aug. 20, 1992 [GB] United Kingdom ............. 9217732

[51] Int. Cl.⁶ ................. G02B 6/36; B31B 1/60
[52] U.S. Cl. ................. 385/88; 385/80; 385/90; 385/91; 385/92; 385/51; 385/52; 156/60; 156/158; 156/304.6; 156/322
[58] Field of Search .............. 385/80, 88, 90, 385/91, 92, 93, 94; 156/60, 69, 73.2, 99, 158, 304.2, 321, 322, 327, 304.6

[56] References Cited

U.S. PATENT DOCUMENTS

| | | | |
|---|---|---|---|
| 4,281,891 | 8/1981 | Shinohara et al. | 385/88 X |
| 4,357,072 | 11/1982 | Goodfellow et al. | 385/94 X |
| 4,399,453 | 8/1983 | Berg et al. | 385/88 X |
| 4,709,979 | 12/1987 | Spodati et al. | 385/92 X |
| 4,779,947 | 10/1988 | Ito | 385/92 X |
| 5,189,716 | 2/1993 | Matsubara et al. | 385/93 |

FOREIGN PATENT DOCUMENTS

| | | | |
|---|---|---|---|
| 0269337 | 6/1988 | European Pat. Off. | 385/88 X |
| 0416169 | 3/1991 | European Pat. Off. | 385/88 X |
| 62-27708 | 5/1987 | Japan | 385/88 X |

*Primary Examiner*—Brian Healy
*Attorney, Agent, or Firm*—Nixon & Vanderhye

[57] ABSTRACT

An optical device, e.g. a signal generator adapted to provide an optical signal to a fibre tail or to a socket adapted to receive a fibre tail, is assembled by two thin films of adhesive. One film is normal to the beam path and, preferably 50–200μ thick. The other film is parallel to the beam path, e.g. surrounding the beam path, and preferably 30–90μ thick. Conveniently the device includes an intermediary component and end of said film adheres one of said components to said intermediary component.

16 Claims, 3 Drawing Sheets

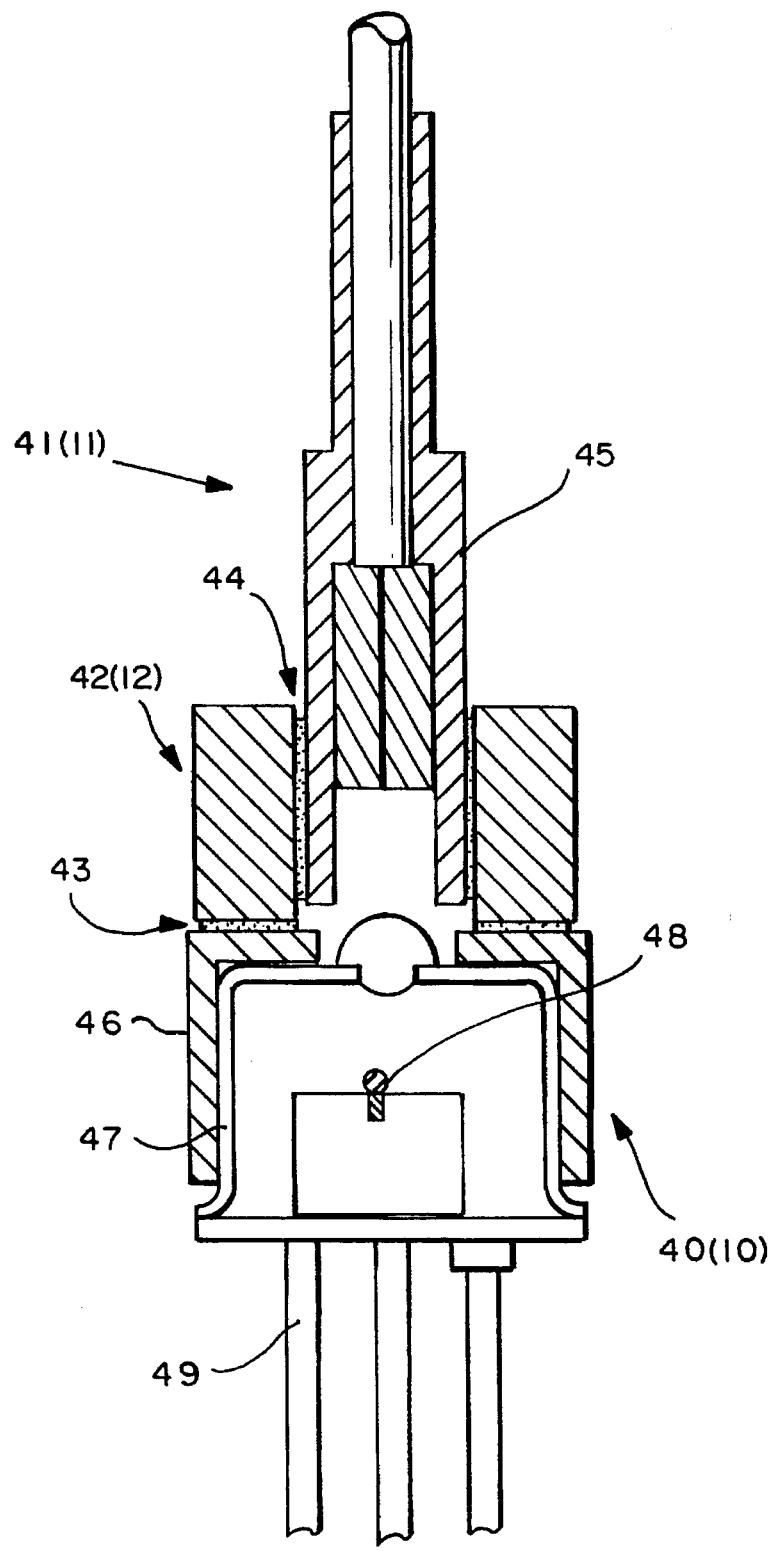

OPTICAL FIBER COUPLED DEVICES AND METHOD OF ASSEMBLING SAME

BACKGROUND OF THE INVENTION

1. Field of the Invention

This invention relates to optical devices and more particularly to an assembly for optical devices comprising two components which are required to be positioned with respect to each other so as to provide for the efficient transmission of optical signals from one to the other.

2. Related Art

The invention has an important application in the manufacture of optical communications apparatus where, for example, accurate and stable relative positioning is required between two components. For the present purposes it is convenient to identify one of the components as a source component and the other as a receptor component. It is a common requirement in optical communications to juxtapose these so that the receptor component is accurately located so as to acquire optical signals provided by the source component. For example, one of the components may comprise a passive optical device in the form of optical fibre waveguide, and the other component an active optical device such as a laser, photo diode. Accurate and stable relative positioning between the source component and the receptor component is required to ensure optimal and stable optical alignment of the optical devices. Similarly, such accurate and stable relative positioning may be required between two components comprising active devices or two components comprising passive devices.

It is now convenient to identify the various forms of optical devices which source components and receptor components commonly comprise.

The source component may comprise a signal generator, e.g. a semiconductor device which converts electric power into an optical signal. Examples of such semiconductor devices include light emitting diodes (LED), edge emitting LEDs (ELED), and a wide variety of semiconductor lasers. Many of these devices comprise waveguiding structures. The signal generator often provides a divergent beam which is inconvenient for forming an optical connection. In such circumstances it is usual for the source component to include lenses which either collimate the beam or to cause it to converge to a focus. The source component may also comprise a passive device, e.g. a passive optical waveguiding structure such as an optical fibre.

The receptor component may be an optical detector, e.g. a semiconductor device which converts an optical signal into an electrical signal. Examples of such devices include photo diodes and PIN diodes. The receptor component may also comprise a waveguiding structure, e.g. a passive waveguiding structure such as an optical fibre, which is adapted to receive an optical signal from the source component for onward transmission to a receiving station.

It should be noted that passive waveguiding structures can be utilised either in the receptor component (e.g. an optical fibre for transmitting the output of an optical transmitter) or in the source component (e.g. an optical fibre terminating at an optical receiver).

Optical isolators are a well known example of passive optical components of the type in which a waveguide structure need not be employed.

It has been mentioned above that one of the components may comprise a waveguiding structure. In some cases the end of an external waveguiding device may be permanently comprised in the component, e.g. a fibre tail may be permanently located for the transmission of the optical signal. However, optical technology includes a wide range of connectors, e.g. connectors in which a plug, connected to a first fibre, is inserted into a socket, connected to a second fibre. In other embodiments of the invention the waveguiding structure takes the form of a plug or a socket which is adapted to connect to an external waveguiding device. When the connection is completed the external waveguiding device is operatively connected to the internal device. The location of the plug or the socket therefore (indirectly) locates the external waveguiding device and this is an important embodiment for optical devices in accordance with the invention.

It is emphasised that, in all the cases mentioned above, a satisfactory performance of assembly depends upon the accurate relative location of the two components whatever form these components may take. It will also be appreciated that, whatever the optical function, the components often comprise similar, or identical cases, and, therefore, the mechanical problem of the assembly of the devices is independent of the optical function.

Typically, the optical tolerances are less than ±3 µm and preferably less than ±1 µm. In the case where one of the components includes a socket or plug for making connections to external waveguides, e.g. fibre, it will be apparent that there is a variability in the overall performance of the assembly because the plug does not always go into exactly the same position in its socket. The plug and socket are designed so that this error is small but it is necessary that the combined error be kept within the tolerances mentioned above. This means that the relative location of the two components is always subject to tight tolerances which must be maintained within the lifetime of the device.

The basic method of assembling the devices is well established. The source component is activated and the relative positions of the source component and the receptor component are experimentally adjusted until the receptor component acquires maximum output. With the two components in this optimum configuration, they are secured by the application of adhesive. Many jigs are available which allow this process to be carried out and the jigs are capable of holding the two components in accurate juxtaposition so long as both remain within the jig. It has, however, been observed that the performance of the assembly deteriorates more rapidly than the lifetimes of its individual components would imply. It is an object of this invention to reduce the rate of this deterioration.

BRIEF SUMMARY OF THE INVENTION

According to this invention the components of an assembly, e.g. a source component and a receptor component, are held together by a thin film of adhesive or by thin films of adhesive. Preferably the assembly includes two forms of adhesive (both of which are thin) e.g. a first film which is normal to the beam path and a second film which is parallel to the beam path. Conveniently the second film has a tubular configuration which surrounds, and is parallel to, the beam path. The first film of adhesive is preferably less than 250 µm thick, e.g. 50–150 µm thick. In the case of the second film of adhesive the preferred thickness is less than 150 µm, especially less than 100 µm, e.g. 30–90 µm. It has been found that device assemblies using thin films of adhesive as described above retain their performance longer than conventional device assemblies which have thick films of adhesive. It is believed that the deterioration in the performance of conventional device assemblies is due to dimensional instability in the adhesive films. Because device assemblies according to the invention have thin films the dimensional instability of the thin films has a smaller effect than in the conventional device assemblies.

Device assemblies according to the invention therefore have two components which are accurately retained in position by thin films of adhesive. In order to achieve the necessary accurate location, it is convenient to utilise an intermediary component wherein each component is separately secured to the intermediary component by means of its own thin film of adhesive. The intermediary component preferably has a cylindrical configuration having a cylindrical wall which is parallel to the beam path and an end face which is normal to the beam path. The end face has an aperture to permit the passage of the optical signal. In the finished assembly the end face is secured to one of the components by means of the first film of adhesive and the cylindrical wall is secured to the other component by means of the second film of adhesive. It will be appreciated that components are usually assembled inside a case which also has a cylindrical wall and an end face with an aperture for the passage of the optical signal. The components are, therefore, geometrically compatible with the intermediary component. It is usually convenient for one of the components to be located at least partially inside the intermediary component in which case the thickness of the second film of adhesive is determined by the thickness of the annulus so formed.

The components and the intermediary component according to the invention can be assembled using techniques very similar to those described above. That is one component is used to support the intermediary component and then the components are adjusted into the correct relationship using a jig as described above. During this adjustment the intermediary component is not attached to the jig whereby it is free to adopt its own location. When the optical signal indicates that the components are suitably aligned a small amount of adhesive is placed on the gap normal to the beam path and surface tension draws the adhesive into the gap and the surface tension also draws the intermediary component into a close relationship so that the first film of adhesive, having a thickness which lies within the range specified, is formed. After the first drop of adhesive has been applied a second drop of adhesive is applied into the other gap which is between the intermediary component and the other component. This gap is parallel to the beam path. Surface tension draws the adhesive into this gap and it tends to center the intermediary component (which is free to move) so that a uniform thin film of adhesive, i.e. the second film of adhesive, is achieved. The second drop should be applied before the first adhesive has hardened whereby the first adhesive does not restrict the centering of the second adhesive. Both sets of adhesive are allowed to set while the source component and the receptor component are held in the correct relationship by the jig and, when both adhesives have set, the correct relationship is made permanent with thin films of adhesive as described above. The thickness of the second film of adhesive is determined by the thickness of the annular gap and the components are sized so that this thickness lies within the specified thickness range for the second film of adhesive.

It will be appreciated that the configuration and techniques described above do not restrict the freedom of relative movement for the initial adjustment of the source component and the receptor component even though the thickness of the adhesive films present in the final device are subject to very stringent thickness specifications.

BRIEF DESCRIPTION OF THE DRAWINGS

The invention will now be described by way of example with reference to the accompanying drawings in which:

FIG. 4 is a device similar to FIG. 3 but the receptor contains a fibre.

DETAILED DESCRIPTION OF EXEMPLARY EMBODIMENTS OF THE INVENTION

Figure 1:
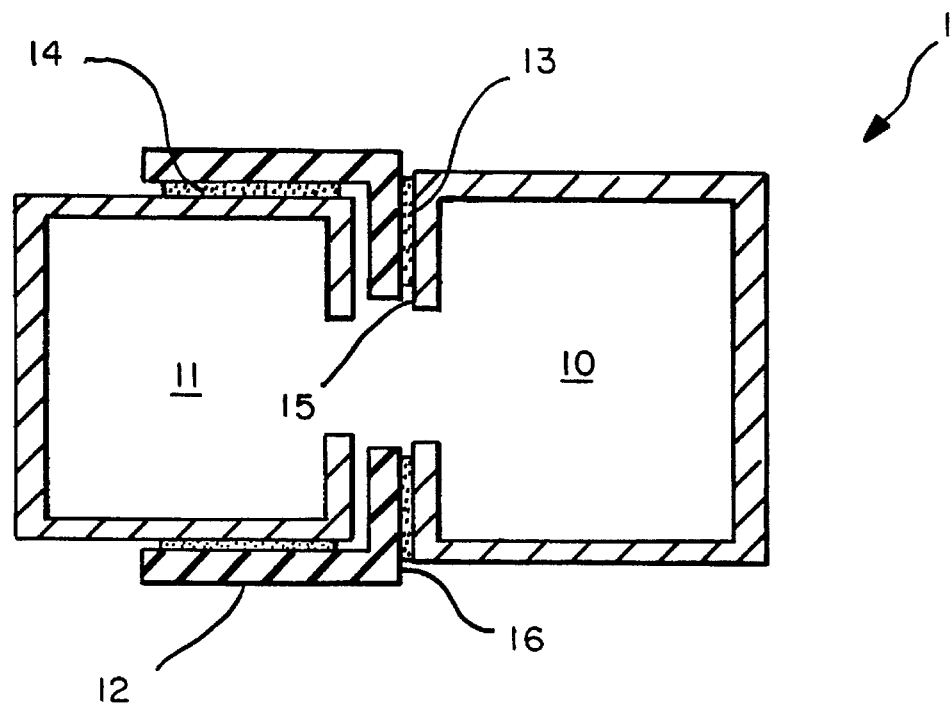
FIG. 1 is a diagrammatic representation of a device in accordance with the invention.

FIG. 1 illustrates an assembly 1 in which two components 10 and 11 are adhered to an intermediary component 12. All three components have cylindrical surfaces and, in particular, cylindrical component 11 is located inside the cylindrical part of the intermediary component 12 so that there is a small annular gap which is preferably about 75µ thick. Component 10 has a surface 15 which is normal to the cylindrical axis and this surface 15 is situated close to an end surface 16 which is normal to the cylindrical axis and is part of the intermediary component 12. The gap between surfaces 15 and 16 contains a first thin film 13 of an adhesive which secures component 10 to component 12. The thickness of the first film 13 is preferably about 200µ thick.

The annular space between the intermediary component 12 and the component 11 also contains a second film of adhesive 14 and this film secures component 11 to intermediary component 12 whereby the relationship between components 10 and 11 is fixed. Because the external diameter of component 11 and the internal diameter of intermediary component 12 are both made to accurate specifications the size of the annulus is fixed and hence the thickness of adhesive film 14 is also controlled to the preferred thickness of about 75µ as stated above.

It will be appreciated that the structure illustrated in FIG. 1 maintains components 10 and 11 in an accurate configuration over long periods of time because the only elements liable to change their dimensions are the two adhesive films 13 and 14 and, because these are thin, and only change in the thickness of the films affect the relative positioning of the components. Therefore, even over long periods the changes that occur are likely to be only very small and acceptable. This is true even though the tolerances are less than ±3µ and it is still possible to achieve tolerances as low as ±1µ.

It will be noted that FIG. 1 is asymmetrical in that component 11 is contained within the intermediary component 12 whereas component 10 is not. One of components 10 and 11 represents a source component and the other represents the receptor component. In spite of the asymmetry just mentioned it is not important which way round the assembly is configured. It will be noted that the beam of radiation travels along the center of the device and that all the components have windows in the center to permit this transmission. In general, the beam path will approximately coincide with the geometrical axes of the various cylinders.

Figure 2:
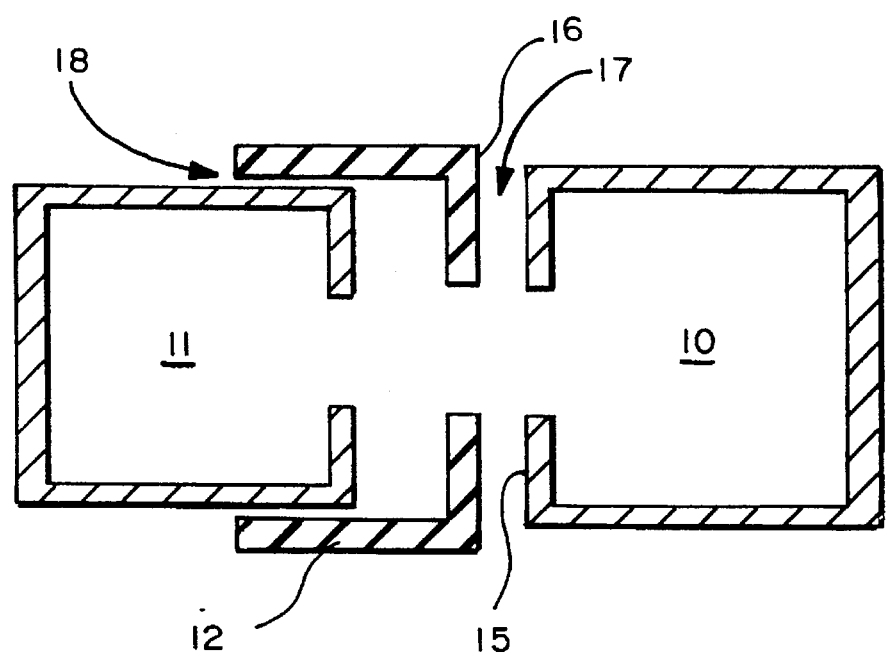
FIG. 2 is a diagrammatic representation showing the device of FIG. 1 in the course of assembly.

FIG. 2 illustrates the important features of the technique for assembling the assembly illustrated in FIG. 1. As a preliminary to assembling, component 11 is introduced into the cylindrical portion of intermediary component 12. Thereafter component 11 is offered up to component 10 but the intermediary component 12 is not gripped so that it is completely free to move except as limited by the presence of component 11 in its cavity. Thus the two components 10 and 11 can be manipulated into their intended relationship and the fact that the intermediary component 12 is not separately constrained means that it does not restrain or hinder the achievement of the correct relationship between components 10 and 11. When the components 10 and 11 have been placed into their accurate alignment a small drop of adhesive is introduced into the gap 17. The adhesive is a liquid at this stage and the gap 17 is sufficiently narrow for the drop to be drawn into the gap by wicking action and, once the liquid adhesive is in the gap, the surface tension of the liquid draws the intermediary component 12 towards the component 10 whereby the thickness of the gap is established by the surface tension. This ensures that the thickness of the adhesive film is within the limits specified above.

After the first drop of liquid adhesive has been applied a second drop is introduced into the annulus 18 between component 11 and the intermediary component 12. The thickness of this annulus is controlled by the size of the two components and it is sufficiently small for the drop to be drawn into the annulus by wicking action and thereafter surface tension tends to center component 11 within the annulus. The various components are preferably warmed, e.g. by using a heated jig, so that the adhesive hardens and sets within a period of about 2 minutes. However, during the early part of this period the two films of adhesive are sufficiently mobile to allow intermediary component 12 to move in accordance with any changes in the size of the adhesive. During this time components 10 and 11 are clamped in the jig so that they are held in their desired relationship and the movement of the intermediary component 12 does not affect the important adjustment. Once the two films of adhesive have dried the components 10 and 11 are fixed permanently in their optimum relationship and, because the films are thin, this accurate relationship is retained throughout the life of the component.

Figure 3:
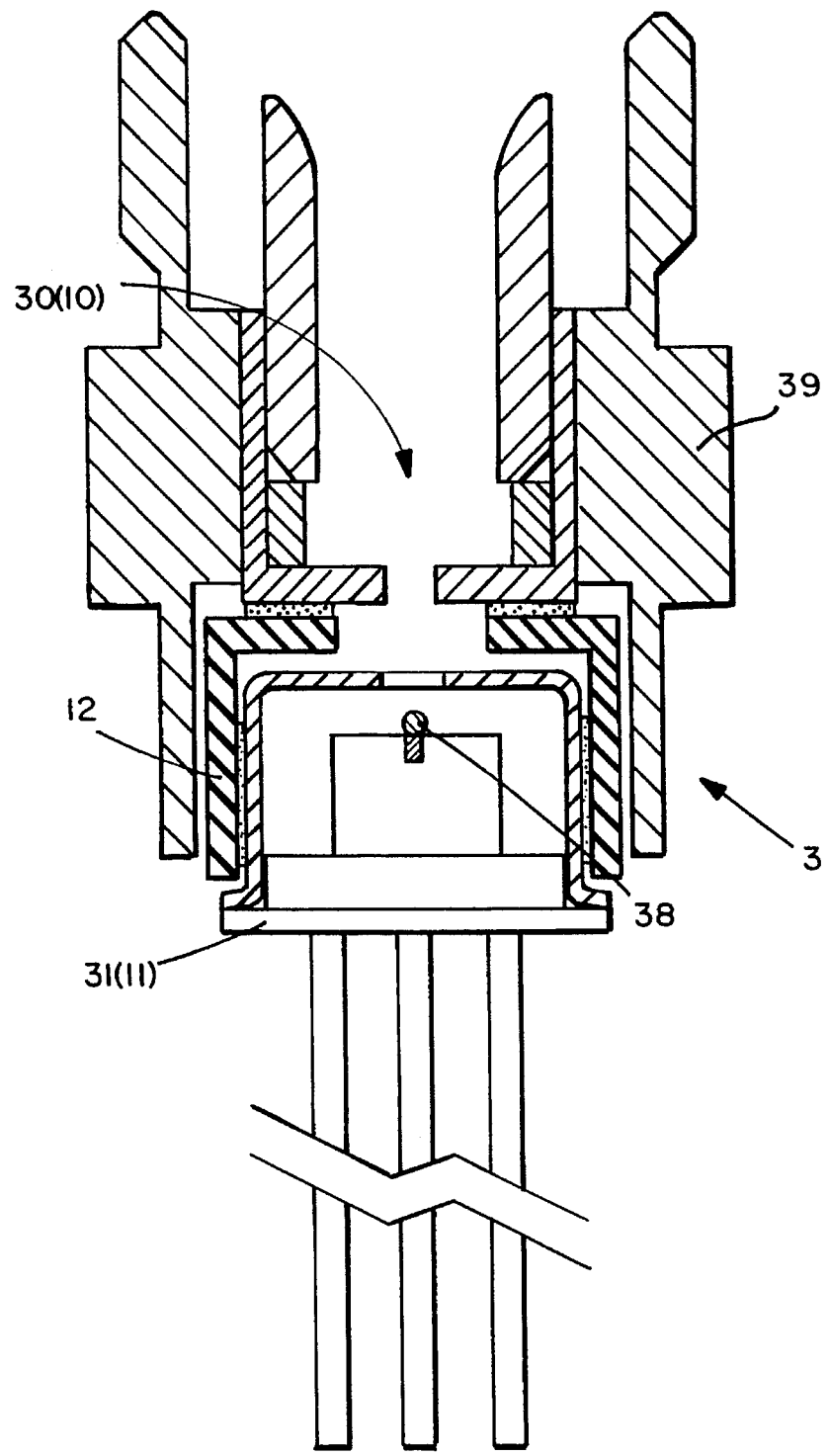
FIG. 3 is a longitudinal cross section illustrating a device in which the receptor is a socket.

FIG. 3 shows the configuration of FIG. 1 applied to an optical assembly 3 in which a source component 31 corresponds to the first working device 11 and a socket 30 for accepting an optical fibre connector (not shown) corresponds to the second working device 10. The socket 30 is adapted to receive a plug attached to a fibre to form a conventional fibre connector and this socket 30 constitutes the receptor component. Moreover, the whole assembly is mounted within an exterior housing 39.

It can be seen that the optical assembly shown in FIG. 3 has the same structure as illustrated in FIG. 1 for achieving long term dimensional stability.

Assembling the assembly proceeds in the same Way as described with reference to FIG. 2. Assembling is carried out on a jig which includes a convenient length of fibre terminated with a suitable plug at one end and connected to an intensity monitor (not shown) at the other. Having placed the source component 31 in the intermediary component 12, the light source 38, such as an ELED, for example, in the source component 31 is activated whereby a beam of light falls on the end of the fibre plugged into the socket 30. Conveniently the socket is clamped immovably and all the adjustment is achieved by moving the source component 30 until the maximum intensity is recorded. At this point the drops of adhesive are applied as described with reference to FIG. 2 and the configuration is made permanent.

FIG. 4 illustrates a device in which the source component 40 is juxtaposed to the end of a fibre 41 which is permanently constituted in the receptor device. In this configuration the source component 40 corresponds to component 10 of FIG. 1 and the receptor component corresponds to component 11. The thick-walled sleeve 42 takes the place of the cup-shaped intermediary component 12 of FIGS. 1 and 2. The assembly is put together in substantially the same manner as that of FIG. 3, with adhesive being introduced into gaps 43 and 44 while components 40 and 41 are clamped in it suitable jig. As before, the intermediary component is free to move subject to the same restraints as before, and is located in the proper position by the surface tension of the adhesive. It should be noted that in the case of FIG. 4, the housing 47, although similar in appearance to the intermediary component of FIGS. 1 to 3, forms instead on of the components 10 or 11, the active device 48 having been previously secured firmly within the cup-shaped casing 46 in such manner that only minimal, and ideally no movement can occur between the housing 47 and the casing 46.

I claim:

1. An assembly for optical devices comprising components which are secured in accurate alignment for the transmission of optical signals by thin films of adhesive having thickness of less than 250μ.

2. An assembly according to claim 1 in which there is a first thin film of adhesive normal to the beam path and a second thin film of adhesive parallel to the beam path.

3. An optical device according to claim 2, wherein the first film of adhesive is 50–200μ thick.

4. An assembly according to claim 2, wherein the second film of adhesive is less than 150μ thick.

5. An assembly according to claim 4, wherein the second film of adhesive is 30–90μ thick.

6. An assembly according to claim 5, wherein the second adhesive film takes the form of a tube surrounding the beam path.

7. An assembly according to claim 2, wherein said device comprises two components namely, a source component adapted to provide a beam of light to a receptor component adapted to receive said beam of light, wherein each of said source component and said receptor component is adhered to an intermediary component whereby they are held in effective adjustment for the transmission of said beam wherein said intermediary component has a first surface normal to said beam path and a second surface parallel to said beam path wherein said first surface is adhered to one of said components by said first film of adhesive and the other of said components is adhered to the intermediary component by said second film of adhesive.

8. A method of assembling an optical device having components which are secured in accurate alignment for the transmission of optical signals by thin films of adhesive, a first thin film of adhesive being normal to an optical beam path and a second thin film of adhesive being parallel to the optical beam path wherein said device comprises two components namely, a source component adapted to provide a beam of light to a receptor component adapted to receive said beam of light, wherein each of said source component and said receptor component is adhered to an intermediary component whereby they are held in effective adjustment for the transmission of said beam wherein said intermediary component has a first surface normal to said beam path and a second surface parallel to said beam path wherein said first surface is adhered to one of said components by said first film of adhesive and the other of said components is adhered to the intermediary component by said second film of adhesive, said method comprising the steps of:

(a) supporting the intermediary component on one of the components, (b) adjusting the relative position of the components for the satisfactory transference of optical signals, wherein the movement of the intermediary component is not constrained except by said support, (c) introducing portions of adhesive into each of the gaps between said intermediary component and each of said components wherein said introduction is substantially achieved by wicking action, and (d) holding said components into the position achieved in step (b).

9. A method as claimed in claim 8 wherein the assembly takes place in a heatable jig.

10. An assembly of optically coupled components secured in accurate optical alignment by thin film adhesive having a thickness of less than 250μ.

11. An assembly as in claim 10 wherein said components are secured by first and second mutually orthogonal thin adhesive films with respect to an intermediate structure.

12. An assembly as in claim 11 wherein one of said orthogonal thin adhesive films is thinner than the other.

13. An assembly as in claim 11 wherein said orthogonal thin adhesive films are respectively perpendicular and parallel to an optical beam coupling path between said components.

14. An assembly as in claim 13 wherein the thin adhesive film parallel to said coupling path is thinner than the thin adhesive film perpendicular to said coupling path.

15. A method for assembling first and second optical components in accurate alignment for transmission of optical signals therebetween over a beam coupling path, said method comprising the steps of:

(a) assembling said optical components in juxtaposition with an intermediate member, there being an adjustable gap between the intermediate member and each of said optical components;

(b) adjusting the relative position of the components while so assembled for the satisfactory transference of optical signals;

(c) introducing a quantity of adhesive into said gaps wherein said introduction is substantially achieved by wicking action; and (d) holding the components in the position achieved by step (b) while the adhesive cures.

16. A method as in claim 15 wherein the assembly is performed in a heated jig.

* * * * *